United States Patent
Miyake

(10) Patent No.: US 11,836,547 B2
(45) Date of Patent: Dec. 5, 2023

(54) DATA TRANSMISSION DEVICE INCLUDING SHARED MEMORY HAVING EXCLUSIVE BANK MEMORIES FOR WRITING AND READING

(71) Applicant: Hitachi Automotive Systems, Ltd., Hitachinaka (JP)

(72) Inventor: Junji Miyake, Tokyo (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 26 days.

(21) Appl. No.: 16/647,807

(22) PCT Filed: Sep. 14, 2018

(86) PCT No.: PCT/JP2018/034137
§ 371 (c)(1),
(2) Date: Mar. 16, 2020

(87) PCT Pub. No.: WO2019/065302
PCT Pub. Date: Apr. 4, 2019

(65) Prior Publication Data
US 2020/0218542 A1   Jul. 9, 2020

(30) Foreign Application Priority Data
Sep. 27, 2017   (JP) .................... 2017-185977

(51) Int. Cl.
*G06F 9/54* (2006.01)
*G06F 9/30* (2018.01)
*G06F 15/167* (2006.01)

(52) U.S. Cl.
CPC .......... *G06F 9/544* (2013.01); *G06F 9/30101* (2013.01); *G06F 15/167* (2013.01)

(58) Field of Classification Search
CPC ........ G06F 9/526; G06F 9/544; G06F 15/167; G06F 9/30101; G06F 9/34; G06F 9/3824; G06F 9/3834; G06F 9/5016
See application file for complete search history.

(56) References Cited

U.S. PATENT DOCUMENTS 5,454,095 A * 9/1995 Kraemer ............... F02D 41/266
                                                         701/104
5,588,936 A * 12/1996 Uchida ............... F16H 61/0213
                                                         477/155
(Continued)

FOREIGN PATENT DOCUMENTS

JP   2006-301894 A   11/2006
JP   2009-217721 A   9/2009
(Continued)

OTHER PUBLICATIONS

Peterson, "Concurrent Reading While Writing", ACM Transactions on Programming Languages and Systems, vol. 5, No. 1, Jan. 1983, pp. 46-55.*

(Continued)

Primary Examiner — David J. Huisman
(74) Attorney, Agent, or Firm — Crowell & Moring LLP

(57) ABSTRACT

A data transmission device includes a shared memory and an access control unit. The shared memory has M bank memories arranged therein and is accessible by N processors. The access control unit controls access to the M bank memories by the N processors based on identification information for specifying the M bank memories.

8 Claims, 13 Drawing Sheets

(56) References Cited

U.S. PATENT DOCUMENTS

| | | | |
|---|---|---|---|
| 9,176,872 B2* | 11/2015 | Mortier | G06F 3/0613 |
| 2002/0112100 A1* | 8/2002 | Zimmerman | G06F 9/544 |
| | | | 710/1 |
| 2006/0242257 A1 | 10/2006 | Kuribayashi | |
| 2009/0204755 A1* | 8/2009 | Rushworth | G06F 9/526 |
| | | | 711/110 |
| 2010/0242051 A1 | 9/2010 | Roettger et al. | |
| 2014/0109069 A1 | 4/2014 | Lee et al. | |
| 2015/0149737 A1* | 5/2015 | Hobson | G06F 9/52 |
| | | | 711/152 |

FOREIGN PATENT DOCUMENTS

| | | |
|---|---|---|
| JP | 2010-501951 A | 1/2010 |
| JP | 2014-78239 A | 5/2014 |

OTHER PUBLICATIONS

Simpson, "Four-Slot Fully Asynchronous Communication Mechanism", Jan. 1990, pp. 17-30.*

Vidyasankar, "Concurrent Reading While Writing Revisited", 1990, pp. 81-85.*

Chen et al., "A Three-Slot Asynchronous Reader/Writer Mechanism for Multiprocessor Real-Time Systems", Jan. 16, 1997, pp. 1-28.*

International Search Report (PCT/ISA/210) issued in PCT Application No. PCT/JP2018/034137 dated Nov. 20, 2018 with English translation (five (5) pages).

Japanese-language Written Opinion (PCT/ISA/237) issued in PCT Application No. PCT/JP2018/034137 dated Nov. 20, 2018 (four (4) pages).

* cited by examiner

FIG. 3
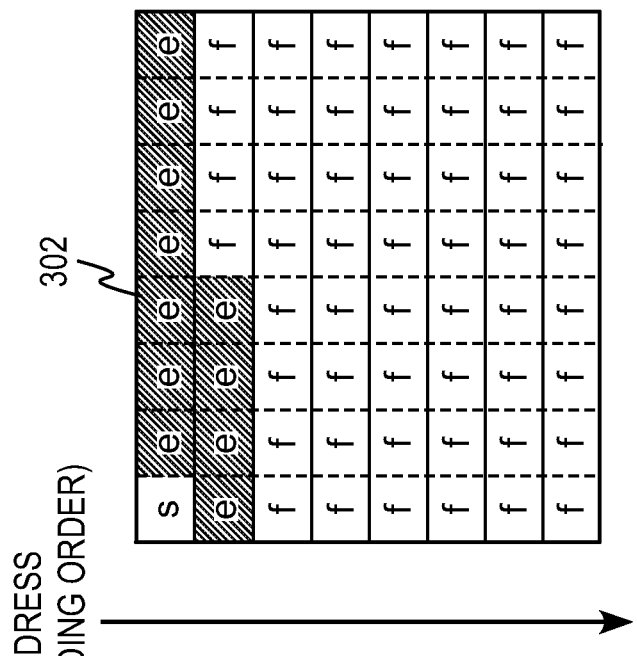
FIG. 3(a)  FIG. 3(b)
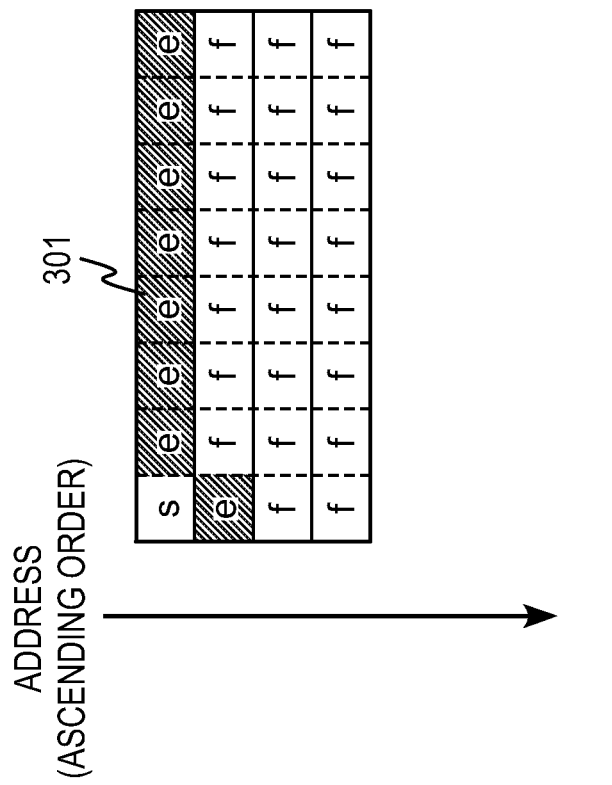
FIG. 3(c)
| PRECISION | sign: SIGN BIT | exponent: EXPONENT PART | fraction: FRACTION PART | TOTAL BYTE NUMBER |
|---|---|---|---|---|
| SINGLE-PRECISION | 1 bit | 8 bits | 23 bits | 4 bytes |
| DOUBLE-PRECISION | 1 bit | 11 bits | 52 bits | 8 bytes |

| SCRATCHPAD MEMORY | CORE CONTAINING FUNCTION ||||
|---|---|---|---|---|
| | CORE C1 | CORE C2 | CORE C3 | CORE C4 |
| P1 | Reserve_Bank_1()<br>Put_Bank_1() | Get_Bank_1()<br>Release_Bank_1() | Get_Bank_1()<br>Release_Bank_1() | Get_Bank_1()<br>Release_Bank_1() |
| P2 | Get_Bank_2()<br>Release_Bank_2() | Reserve_Bank_2()<br>Put_Bank_2() | Get_Bank_2()<br>Release_Bank_2() | Get_Bank_2()<br>Release_Bank_2() |
| P3 | Get_Bank_3()<br>Release_Bank_3() | Get_Bank_3()<br>Release_Bank_3() | Reserve_Bank_3()<br>Put_Bank_3() | Get_Bank_3()<br>Release_Bank_3() |
| P4 | Get_Bank_4()<br>Release_Bank_4() | Get_Bank_4()<br>Release_Bank_4() | Get_Bank_4()<br>Release_Bank_4() | Reserve_Bank_4()<br>Put_Bank_4() |

FIG. 11(b)

DATA TRANSMISSION DEVICE INCLUDING SHARED MEMORY HAVING EXCLUSIVE BANK MEMORIES FOR WRITING AND READING

TECHNICAL FIELD

The present invention relates to a data transmission device for in-vehicle multi-core control and an electronic control device applicable to fuel control of an engine.

BACKGROUND ART

In order to meet a demand for higher performance, the improvement of processing capability has been tried by increasing a clock frequency of a central processing unit (CPU) in an embedded system. However, as a result, power consumption, heat generation, and noise of the CPU have been increased. In contrast, a multi-core system in which a plurality of cores of the CPU is implemented within a chip and a load on each core is reduced has been attracting attention in recent years.

In the multi-core system, a processing throughput is improved by dividing and distributing control performed by a single core for each core and performing parallel processing. However, inter-task exclusion control performed by an operating system (OS) through the control of the single core and interrupt inhibition control of a critical section due to interrupt inhibition are not established in multi-core. In the multi-core system, a set of data items (data set) may be transmitted from a CPU of a transmitter to a CPU of a receiver while ensuring simultaneity. At this time, when some kind of protection mechanism is not set, the CPU of the transmitter may rewrite other data of the data set while the CPU of the receiver is reading a part of the data of the data set. This is because a plurality of CPUs each has execution codes, and is basically operated asynchronously.

As a method of eliminating such a phenomenon, spinlock control using a lock variable has been known in the related art. This is an inter-processor exclusive control system in which a specific memory region can be accessed by only the CPU in which a key indicating the lock variable is being used is set by using an atomic (indivisible) variable check and write instruction such as a test-and-set instruction and setting the key to a specific lock variable.

However, an execution section related to a resource in which the inter-processor exclusive control is performed through the spinlock control is not a parallel execution section but a serial execution section for the multi-core. Accordingly, as the serial execution time becomes longer, parallel execution performance when the multi-core is viewed as a whole is deteriorated by Amdahl's law. Amdahl's law describes a phenomenon in which when a speed of a program is increased through parallel computation by using a plurality of processors, the increase of the speed is limited by a time of a portion of the program that needs to be sequentially executed.

As granularity of a memory in which the spinlock is performed becomes larger and the plurality of CPUs is further involved, a time necessary to wait for the lock is increased (in proportion to the number of CPUs in the case of the spinlock mechanism with consideration for scalability), and real-time properties of processing performed by the CPU are impaired.

Meanwhile, when the memory granularity is reduced and the number of lock variables (and corresponding exclusive resources) is increased, since management is complicated, it is difficult to estimate a worst execution time for the control of each CPU (and it is difficult to predict a ripple effect on a specification change).

A motivation for performing a method of reducing the memory granularity is actually in reverse. Since the number of upper limits of the lock variable that can be set is decided due to restrictions of the system and multi-core OS and the management is complicated such as the copying of a value having the same variable and different locks, lock granularity tends to be increased in design. In an extreme case, design prospects are improved in a case where a whole global variable is used as a lock unit compared to a case where many fine-grained locks are used. (This is called a giant lock.) Therefore, as a result of this method, the number of CPUs that lock is increased, and thus, a lock waiting time tends to be overlooked.

From the aforementioned viewpoint, it is preferable that the spinlock control is not used in multi-core for in-vehicle control in which hard real-time properties are more concerned. In particular, in the multi-core system, when the number of CPUs is increased, the lock waiting time is proportionally increased even in a favorable method (this is called a scalable method).

Thus, a data transmission method between the CPUs in which the spinlock is not used as illustrated in the following related art is devised.

CITATION LIST

Patent Literature

PTL 1: JP 2009-217721 A

SUMMARY OF INVENTION

Technical Problem

However, in a technology disclosed in PTL 1, data is transmitted and received by using a server-client model by regarding the CPU of the transmitter of the data as a server and the CPU of the receiver as a client.

The CPU of the receiver writes a data request command in a notification region (shared memory). The CPU of the transmitter interprets this command, writes data requested in an assignment region (shared memory) of the receiver, and rewrites this command in a completed value.

That is, when a request frequency of the CPU of the receiver and a data generation frequency of the CPU of the transmitter are completely synchronized as a complete handshake operation, the method fails. When the request frequency of the receiver is high, the same data cannot be appropriately overwritten, and when the data generation frequency of the transmitter is high, the receiver cannot appropriately skip the data. This is a burden in an asynchronous data transmission and reception system between the CPUs. (Transmission and reception of data are not loosely coupled.)

The server-client model is a remote call method for the CPU (the CPU of the transmitter) to which an object to be operated belongs. Thus, an operation of the CPU that generates data (the CPU of the transmitter) is obstructed, and the CPU (the CPU of the receiver) that requests an operation needs to wait for operation completion notification. Accordingly, real-time properties of both the CPU of the transmitter and the CPU of the receiver are worse.

The present invention has been made in view of the above circumstances, and an object of the present invention is to provide a data transmission device for in-vehicle multi-core and an electronic control device capable of transmitting a data set with ensured simultaneity between cores while improving real-time properties of processing performed by the core even when the cores of a multi-core system are asynchronously operated.

Solution to Problem

In order to achieve the above object, a data transmission device for in-vehicle multi-core control according to a first aspect is a data transmission device for in-vehicle multi-core control that includes M (M is an integer of 2 or more) number of bank memories and N (N is an integer of 2 or more) number of processors accessible to the bank memories. The device includes a shared memory on which the M number of bank memories are arranged and which is accessible from the N number of processors; and an access control unit that controls the accessing the bank memory from the processor based on identification information for specifying the bank memory.

Advantageous Effects of Invention

According to the present invention, even when the cores in the multi-core system are asynchronously operated, it is possible to transmit a data set with ensured simultaneity between the cores while improving real-time properties of processing of the cores.

BRIEF DESCRIPTION OF DRAWINGS

FIG. 3A is a diagram illustrating a data structure of a single-precision floating-point number applicable to a data transmission device according to the embodiment, FIG. 3B is a diagram illustrating a data structure of a double-precision floating-point number applicable to the data transmission device according to the embodiment, and FIG. 3C is a diagram illustrating bit assignment methods of the data structures of FIGS. 3A and 3B.

FIG. 11B is a diagram illustrating an assignment method of a function to a core for each scratchpad memory of the data transmission device according to the embodiment.

DESCRIPTION OF EMBODIMENTS

An embodiment will be described with reference to the drawings. The embodiment to be described below does not limit inventions according to the claims, and all elements and combinations described in the embodiment are not essential for the solution of the invention. Although engine control is used as an example of the disclosure field of the embodiment, the present invention can be applied to not only the engine control but also various fields requiring in-vehicle real-time control such as drive train control such as transmission control, chassis control related to anti-vibration and damper, driving force control such as an anti-lock brake system, active safety such as collision safety, and a traction control system, and automatic traveling control.

Figure 1:
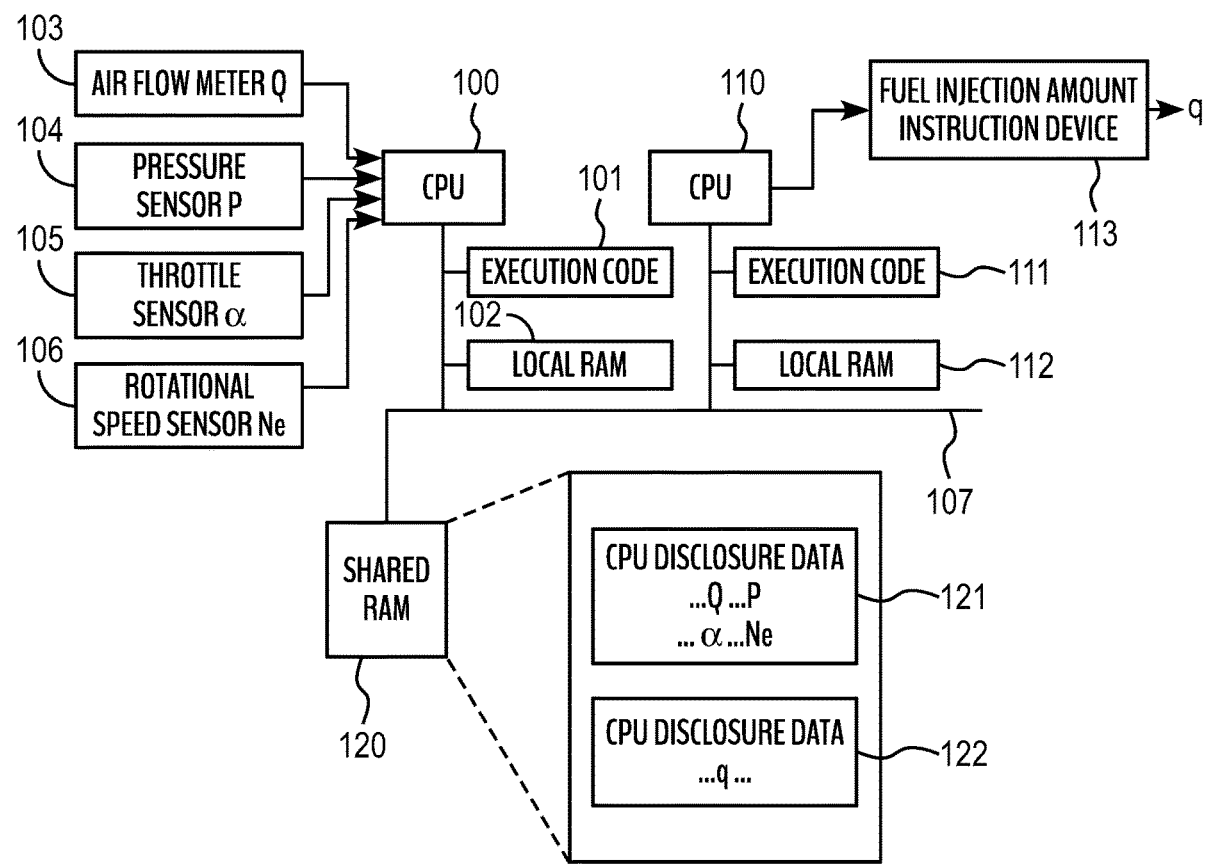
FIG. 1 is a block diagram illustrating a hardware configuration of a multi-core control device according to an embodiment.

FIG. 1 is a block diagram illustrating a hardware configuration of a multi-core control device according to the embodiment. In FIG. 1, a configuration in which a fuel control device of an engine is realized by two cores is used as an example.

In FIG. 1, the fuel control device includes central processing units (CPUs) 100 and 110, execution code storage regions in which execution codes 101 and 111 are stored, local random access memory (RAMS) 102 and 112, and a shared RAM 120.

An air flow meter 103, a pressure sensor 104, a throttle sensor 105, and a rotational speed sensor 106 are connected, as sensor inputs, to the CPU 100. The air flow meter 103 outputs a sensor value for calculating an intake air amount Q. The pressure sensor 104 outputs a sensor value for calculating an intake pipe pressure P. The throttle sensor 105 outputs a sensor value for calculating a throttle opening α. The rotational speed sensor 106 outputs a sensor value for calculating an engine rotational speed Ne.

A fuel injection amount instructing device 113 is connected, as an actuator output, to the CPU 110. The fuel injection amount instructing device 113 outputs a fuel injection amount q of the engine.

The CPU 100 is mainly in charge of sensor input processing, and performs processing by using the execution code 101 and the local RAM 102. The local RAM 102 is a memory resource that can be accessed only from the CPU 100.

The CPU 110 is mainly in charge of numerical calculation and output actuator operation, and executes processing using the execution code 111 and the local RAM 112. The local RAM 112 is a memory resource that can be accessed only from the CPU 110.

The shared RAM 120 is connected, as a commonly accessible resource, to the CPUs 100 and 110 via a bus 107. A storage region of data necessary to be disclosed to the other CPU 110 or 100 from one CPU 100 or 110 is provided on the shared RAM 120 in order to achieve overall control.

CPU disclosure data 121 and 122 are stored in this storage region. The intake air amount Q, the intake pipe pressure P, the throttle opening α, and the engine rotational speed Ne can be set as the CPU disclosure data 121. The fuel injection amount q can be set as the CPU disclosure data 122.

Figure 2A:
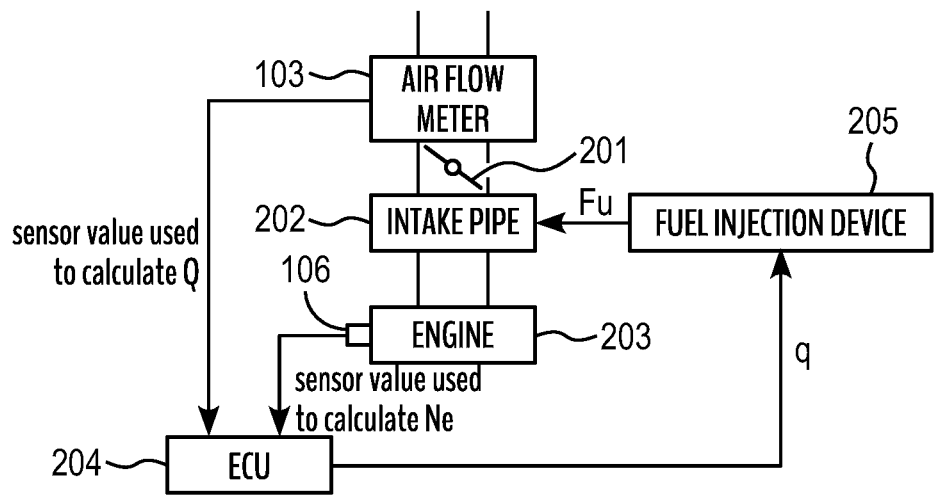
FIGS. 2A to 2C are block diagrams illustrating a configuration example of a fuel injection system of an engine to which an electronic control device according to the embodiment is applied.
Figure 2B:
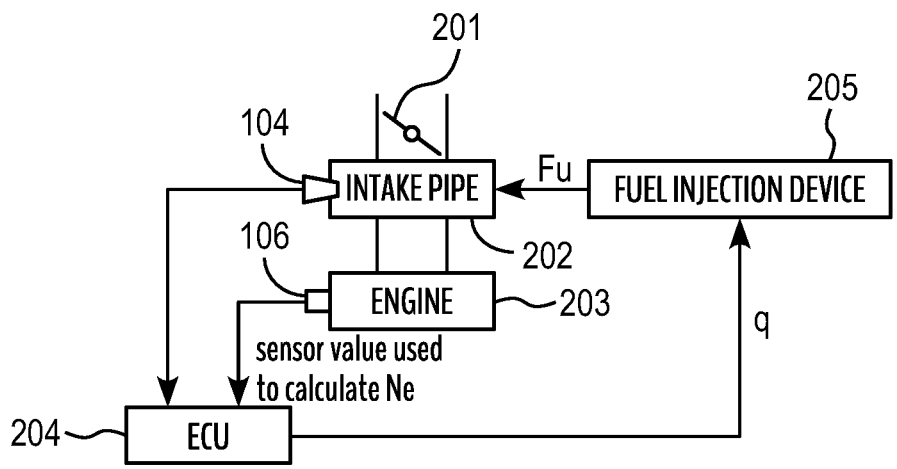
Figure 2C:
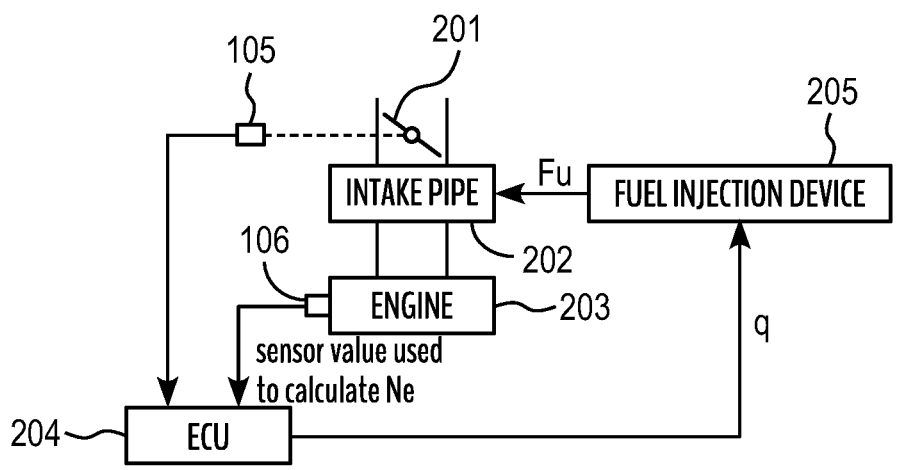

FIG. 2 is a block diagram illustrating a configuration example of an engine fuel injection system to which an electronic control device according to the embodiment is applied. FIG. 2 illustrates three methods mainly used in the fuel injection system. FIG. 2(a) illustrates a mass flow method, FIG. 2(b) illustrates a speed density method, and FIG. 2(c) illustrates an a-N method.

In FIGS. 2(a) to 2(c), an intake pipe 202 is connected to an engine 203, and a fuel injection device 205 is connected to the intake pipe 202. A throttle chamber 201 is provided on an upstream side of the intake pipe 202. The rotational speed sensor 106 is provided at the engine 203. An electronic control unit (ECU) 204 that performs fuel control is provided at the fuel injection system. The ECU 204 can include the CPUs 100 and 110 of FIG. 1, the execution code storage region in which the execution codes 101 and 111 are stored, the local RAMs 102 and 112, and the shared RAM 120.

As illustrated in FIG. 2(a), the air flow meter 103 is provided on an upstream side of the throttle chamber 201 in the mass flow method.

The sensor value for calculating the intake air amount Q is input from the air flow meter 103 to the CPU 100 of the ECU 204, and the sensor value for calculating the engine rotational speed Ne is input from the rotational speed sensor 106 to the CPU 100.

In the CPU 100, the intake air amount Q and the engine rotational speed Ne are calculated from these sensor values, and are stored in the shared RAM 120.

Subsequently, in the CPU 110, the intake air amount Q and the engine rotational speed Ne are read from the shared RAM 120. The fuel injection amount q is calculated as $q \propto Q/Ne$.

Meanwhile, as illustrated in FIG. 2(b), the pressure sensor 104 is provided at the intake pipe 202 in the speed density method.

The sensor value for calculating the intake pipe pressure P is input from the pressure sensor 104 to the CPU 100 of the ECU 204, and the sensor value for calculating the engine rotational speed Ne is input from the rotational speed sensor 106 to the CPU. In the CPU 100, the intake pipe pressure P and the engine rotational speed Ne are calculated from these sensor values, and are stored in the shared RAM 120.

Subsequently, in the CPU 110, the intake pipe pressure P and the engine rotational speed Ne are read from the shared RAM 120. The fuel injection amount q is calculated as $q \propto f_1(P, Ne)$. $f_1( )$ is a function decided from engine characteristics.

Meanwhile, as illustrated in FIG. 2(c), the throttle sensor 105 is provided at the throttle chamber 201 in the α-N method.

The sensor value for calculating the throttle opening α is input from the throttle sensor 105 to the CPU 100 of the ECU 204, and the sensor value for calculating the engine rotational speed Ne is input from the rotational speed sensor 106 to the CPU. In the CPU 100, the throttle opening α and the engine rotational speed Ne are calculated from these sensor values, and are stored in the shared RAM 120.

Subsequently, in the CPU 110, the throttle opening α and the engine rotational speed Ne are read from the shared RAM 120. The fuel injection amount q is calculated as $q \propto f_2(\alpha, Ne)$. $f_2( )$ is a function decided from engine characteristics.

Here, when a data set {Q, P, α, Ne} calculated by the CPU 100 that performs the sensor input processing is used by the CPU 110 that calculates the fuel injection amount q, it is important that the values of the data set {Q, P, α, Ne} are data items obtained from the sensor values measured at almost the same time. This relationship is called simultaneity of the data set. The simultaneity between the data items within this data set is called macroscopic simultaneity. When the simultaneity of this data set is lost, calculation accuracy of the fuel injection amount q corresponding to the data set {Q, P, α, Ne} is lowered.

For example, in the mass flow method of FIG. 2(a), the CPU 100 arbitrarily rewrites the engine rotational speed Ne of the CPU disclosure data 121 with a value at another time while the CPU 110 reads the intake air amount Q of the CPU disclosure data 121, the simultaneity between the intake air amount Q and the engine rotational speed Ne is lost for the CPU 110. At this time, the fuel injection amount q calculated as $q \propto Q/Ne$ becomes incorrect control data. Thus, a multi-core system requires attention such that the simultaneity of the data set is not lost by ensuring the simultaneity of the data set.

FIG. 3(a) is a diagram illustrating a data structure of a single-precision floating-point number applicable to a data transmission device according to the embodiment, and FIG. 3(b) is a diagram illustrating a data structure of a double-precision floating-point number applicable to the data transmission device according to the embodiment, and FIG. 3(c) is a diagram illustrating bit assignment methods of the data structures of FIGS. 3(a) and 3(b). In FIGS. 3(a) and 3(b), an address ascending order is represented on a vertical axis.

In the examples of FIGS. 3(a) and 3(b), the data structure has a storage order of data in a big-endian format, and conforms to the IEEE754 standard (IEEE Standard for Floating-Point Arithmetic (ANSI/IEEEStd754-2008)).

FIG. 3(a) illustrates 4-byte single-precision data 301. FIG. 3(b) illustrates 8-byte double-precision data 302. In the single-precision data 301 and the double-precision data 302, s represents a sign bit, e represents an exponent part bit, and f represents a fraction part bit.

As illustrated in FIG. 3(c), in the single-precision data 301, 1 bit is assigned to the sign bit, 8 bits are assigned to the exponent parts, and 23 bits are assigned to the fraction part. In the double-precision data 302, 1 bit is assigned to the sign bit, 11 bits are assigned to the exponent parts, and 52 bits are assigned to the fraction parts.

Even though the single-precision data 301 (or double-precision data 302) is a single numerical value, the numerical value is rewritten in each byte mapped to an address. Thus, when the single-precision data 301 (or double-precision data 302) is accessed while a part of the single-precision data 301 (or double-precision data 302) is partially rewritten, numerical values having no meaning as data are input.

Data having a data structure across multiple bytes needs to be input after the rewriting of all the bytes is ended. Some bytes of the data need to be rewritten while a reader is reading the data.

Consistent simultaneity between bytes of one data having the data structure across the multiple bytes is called microscopic simultaneity.

In order for data to be input in the multi-core system to be meaningful, it is necessary to ensure not only the macroscopic simultaneity but also the microscopic simultaneity.

The destruction of the data simultaneity described above is caused by contention in reading from and writing in the same memory region by a plurality of CPUs. In order to avoid such contention, inter-CPU exclusive control in which a plurality of CPUs cannot simultaneously access the same memory region may be performed.

Figure 4:
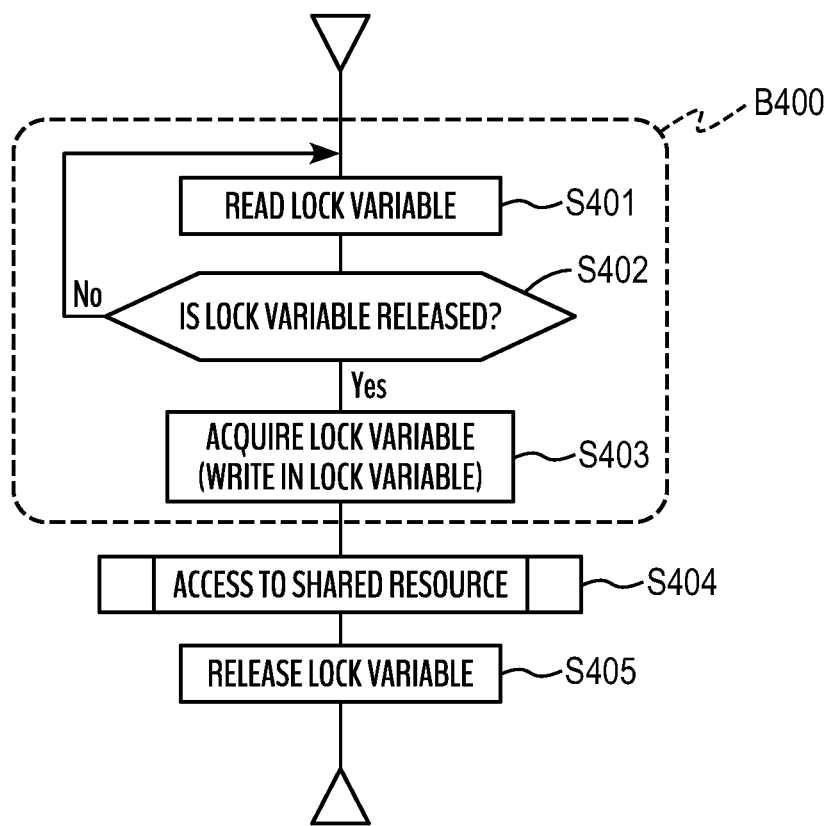
FIG. 4 is a flowchart illustrating a spinlock control method according to a comparative example of the embodiment.

FIG. 4 is a flowchart illustrating a spinlock control method according to a comparative example of the embodiment.

FIG. 4 illustrates a case where the spinlock control method is used in order to perform the inter-CPU exclusive control. In FIG. 4, the CPU reads a lock variable (S401). The lock variable is ensured on a shared memory in the same manner as the shared resource that is exclusively controlled.

Subsequently, it is checked whether the lock variable is released (value is zero) by testing the lock variable (S402). When the lock variable is released, the CPU acquires the lock variable, and writes a value in the lock variable (S403). When the lock variable is not released, the process returns to S401, the CPU reads the lock variable again, and repeats the test.

Subsequently, when the lock variable is acquired, the CPU accesses the shared resource (S404). Thereafter, the CPU releases the lock variable (S405).

This operation is called a spinlock since the variable is read by a loop operation until the lock variable is released and the waiting is continued while the test is continued.

A series of operations of S401, S402, and S403 are implemented by using an atomic instruction B400 such as a test-and-set instruction. The atomic instruction is an inseparable composite instruction set that cannot be interfered by another CPU while a certain CPU is executing the instruction.

Figure 5:
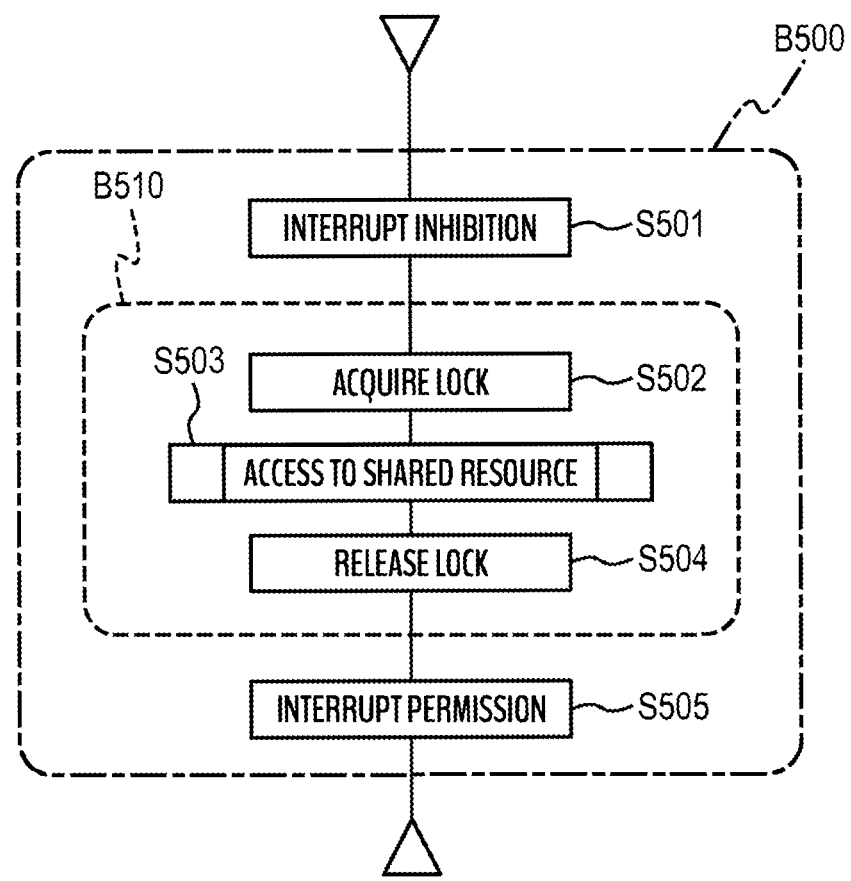
FIG. 5 is a flowchart illustrating a relationship between spinlock control and interrupt inhibition according to a comparative example of the embodiment.

FIG. 5 is a flowchart illustrating a relationship between spinlock control and interrupt inhibition according to a comparative example of the embodiment. FIG. 5 illustrates a nesting relationship between the spinlock control illustrated in FIG. 4 and an interrupt inhibition section.

In FIG. 5, interrupt inhibition (S501) and interrupt permission (S505) are provided in an in-processor exclusive control section B500. A section between the interrupt inhibition (S501) and the interrupt permission (S505) is an interrupt inhibition section. An inter-processor exclusive control section B510 is provided in this interrupt inhibition section. In the inter-processor exclusive control section B510, when the CPU acquires the lock (S502), the CPU accesses the shared resource (S503), and then the CPU releases the lock (S504).

At this time, while a certain CPU is accessing the shared resource, another CPU is inhibited from accessing the shared resource. The inter-processor exclusive control B510 is included in the in-processor exclusive control B500, and this nesting relationship is maintained.

This nesting relationship is maintained, and thus, a certain CPU cannot perform interrupt control from when this CPU acquires the lock to when this CPU releases the lock. Since the interrupt control is performed depending on the convenience of the CPU, the interrupt control does not need to be included in a quantitative relationship between a lock execution time and a lock waiting time among the plurality of CPUs.

Therefore, the interrupt control of a certain CPU during the acquisition of the lock is inhibited, and thus, it is possible to prevent a time until the CPU releases the lock from extending through the interrupt control. Thus, an increase in lock waiting time of another CPU can be suppressed, and effectiveness of real-time control can be ensured. The CPU which is waiting for the lock can correctly estimate a worst value of the lock waiting time. In contrast, when the interrupt control during the lock acquisition of the CPU is permitted, it is difficult to manage the lock waiting time.

In the method of performing the spinlock while maintaining the nesting relationship in FIG. 5, the lock waiting time increases as the number of CPUs which are waiting for the lock increases. This lock waiting time increases in proportion to the number of CPUs which are waiting for the lock with a best method, and increases exponentially with the worst method. The method of increasing the lock waiting time in proportion to the number of CPUs is called a method that is scalable with respect to the number of CPUs. In this method, requests of CPUs which are waiting for the lock are stored in a queue, and lock rights are given in the order of requests.

Here, as illustrated in FIG. 5, the inter-processor exclusive control section B510 in which the lock is waited for is located in the in-processor exclusive control section B500 that inhibits the interrupt. Thus, when the lock waiting time (S502 to S504) increases, an interrupt inhibition time (S501 to S505) also inevitably increases.

That is, when the CPUs 100 and 110 which are multi-core are used in order to improve processing performance of the ECU 204, the interrupt inhibition time also increases as the number of CPUs increases in the spinlock control. An increase in interrupt inhibition time causes a failure of hard real-time control in in-vehicle applications. When the number of CPUs is limited in order to prevent the failure of the hard real-time control, it difficult to improve the processing performance of the ECU 204.

In order to prevent the failure of the hard real-time control without limiting the number of CPUs, a lockless method in which the waiting using the lock variable does not occur is desirable.

Figure 6:
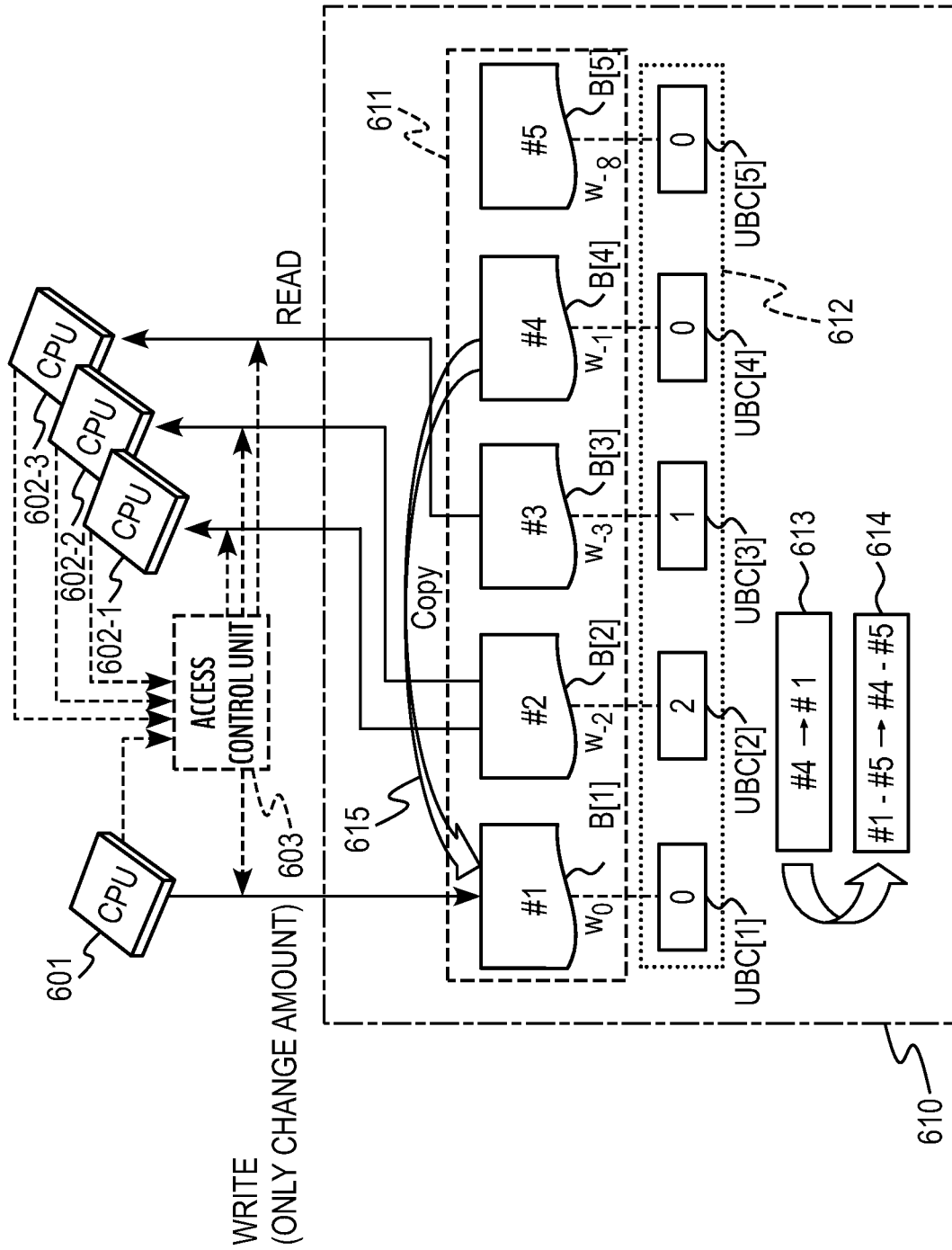
FIG. 6 is a block diagram illustrating a configuration example of the data transmission device according to the embodiment.

FIG. 6 is a block diagram illustrating a configuration example of the data transmission device according to the embodiment. In the following description, a configuration in which five bank memories and four CPUs that can access these bank memories are provided is used as an example. The CPU can be used as a processor. The processor may be a micro processing unit (MPU) or a digital signal processor (DSP).

In FIG. 6, the data transmission device includes five bank memories B[1] to B[5], and a write core 601 and read cores 602-1, 602-2, and 602-3 that can access these bank memories B[1] to B[5]. The write core 601 can be provided in a CPU used for writing. The read cores 602-1, 602-2, and 602-3 can be provided in a CPU used for reading.

The bank memories B[1] to B[5] can be provided in a shared memory 610. The shared memory 610 can be accessed from the write core 601 and the read cores 602-1, 602-2, and 602-3. The bank memories B[1] to B[5] can have the same variable contents and the same offset address from the head. Bank numbers #1 to #5 are respectively added, as identification information items for specifying the bank memories B[1] to B[5], to the bank memories B[1] to B[5].

The scratchpad memory 611 can be constituted by grouping the bank memories B[1] to B[5]. The scratchpad memory 611 can be used for temporary data transfer. The scratchpad memory 611 is a name used to collectively indicate a bank memory group, that is, the bank memories B[1] to B[5].

An access control unit 603 is provided in the data transmission device.

The access control unit 603 controls the accessing the bank memories B[1] to B[5] from the write core 601 and the read cores 602-1, 602-2, and 602-3 based on the bank numbers #1 to #5 for specifying the bank memories B[1] to B[5]. At this time, the access control unit 603 can manage the target bank memories B[1] to B[5] by using the associated bank numbers #1 to #5.

Specifically, the access control unit 603 assigns only one write core 601 to the bank memories B[1] to B[5] in which writing is performed. One or more read cores 602-1, 602-2, and 602-3 are assigned to the bank memories B[1] to B[5] in which the reading is performed. The accessing the bank memories B[1] to B[5] can be exclusively controlled such that the bank memories B[1] to B[5] in which the writing is performed and the bank memories B[1] to B[5] in which the reading is performed are not the same.

The CPU provided with the write core 601 or the read cores 602-1, 602-2, and 602-3 executes a program related to access control, and thus, the access control unit 603 can realize the control by distributing the control on software or firmware of each CPU.

At this time, an execution code for realizing a write operation and a function including the execution code are locally retained in the CPU provided with the write core 601. The CPU provided with the write core 601 can realize the access control unit 603 by executing the execution code for realizing the write operation and the function including the execution code.

An execution code for realizing a read operation and a function including the execution code are locally retained in the CPU provided with the read cores 602-1, 602-2, and 602-3. The CPU provided with the read cores 602-1, 602-2, and 602-3 can realize the access control unit 603 by executing the execution code for realizing the read operation and the function including the execution code.

A counter array region 612 and registers 613 and 614 are provided in the shared memory 610. The counter array region 612 stores count values UBC[1] to UBC[5] corresponding to the current number of times of accessing the bank memories B[1] to B[5] from the read cores 602-1, 602-2, and 602-3 in association with the bank memories B[1] to B[5]. The UBC[1] to UBC[5] of the counter array region 612 are referred to as bank using counters.

The register 613 stores the bank numbers #1 to #5 for specifying the bank memories B[1] to B[5] in which the writing is performed last by the write core 601. The bank memories B[1] to B[5] indicated by the register 613 are referred to as latest data banks. The register 614 stores the bank numbers #1 to #5 for specifying the bank memories B[1] to B[5] which are other than the bank memories B[1] to B[5] (that is, the bank memories indicated by the register 613) in which the writing is performed last and are not accessed from any of the read cores 602-1, 602-2, and 602-3. The bank memories B[1] to B[5] indicated by the register 614 are referred to as free banks.

At this time, the write core 601 and the read cores 602-1, 602-2, and 602-3 can refer to or change the count values UBC[1] to UBC[5] stored in the counter array region 612 and the bank numbers #1 to #5 stored in the registers 613 and 614.

When the count values UBC[1] to UBC[5] stored in the counter array region 612 and the bank numbers #1 to #5 stored in the registers 613 and 614 are changed, the atomic instruction can be used such that interference (contention) from the write core 601 and read core 602-1, 602-2, and 602-3 can be eliminated.

When there is a read request from the read cores 602-1, 602-2, and 602-3, the access control unit 603 refers to the bank numbers #1 to #5 stored in the register 613. The bank memories B[1] to B[5] in which the writing is performed last are specified based on the referring result, and the bank numbers #1 to #5 are notified to the read cores 602-1, 602-2, and 602-3. The access control unit 603 increments the count values UBC[1] to UBC[5] of the bank memories B[1] to B[5] corresponding to the bank numbers #1 to #5 stored in the register 613 by 1.

Subsequently, when there is a return request for the bank memories B[1] to B[5] from the read cores 602-1, 602-2, and 602-3, the access control unit 603 decrements the count values UBC[1] to UBC[5] of the bank memories B[1] to B[5] by 1. When the count values UBC[1] to UBC[5] of the bank memories B[1] to B[5] are 0 and the bank numbers #1 to #5 do not match the bank numbers #1 to #5 stored in the register 613, the bank numbers #1 to #5 of the bank memories B[1] to B[5] are registered in the register 614.

Meanwhile, when there is a write request from the write core 601, the access control unit 603 refers to the bank numbers #1 to #5 stored in the register 614.

The bank memories B[1] to B[5] which are other than the bank memories B[1] to B[5] (that is, the bank memories indicated by the register 613) in which the writing is performed last and are not used for reading using any of the read cores 602-1, 602-2, and 602-3 are specified based on the referring result. The access control unit 603 notifies the write core 601 of the bank numbers #1 to #5 of the specified bank memories B[1] to B[5]. The access control unit 603 deletes the bank numbers #1 to #5 notified to the write core 601 from the register 614.

Before the bank numbers #1 to #5 of the bank memories B[1] to B[5] in which the writing is performed are notified to the write core 601, data of the bank memories B[1] to B[5] (that is, the bank memories indicated by the register 613) retaining the latest data is copied to the bank memories B[1] to B[5] corresponding to the bank numbers #1 to #5 notified to the write core 601. At this time, the write core 601 can rewrite only a difference corresponding to a value changed and the value at the time of the previous writing.

When the write core 601 releases the bank memory B[1] to B[5] in which the latest data is written, the bank numbers #1 to #5 stored so far in the register 613 are rewritten with the bank numbers #1 to #5 of the bank memories B[1] to B[5] in which the latest data is written. When the count values UBC[1] to UBC[5] of the bank memories B[1] to B[5] corresponding to the bank numbers #1 to #5 stored so far in the register 613 are 0, that bank numbers #1 to #5 of the bank memories B[1] to B[5] are registered in the register 614.

Hereinafter, operations of the write core 601 and the read cores 602-1, 602-2, and 602-3 will be described in a sequence of time. It is assumed that the values of the bank memories B[1] to B[5] are updated (written) in order of figures of W with subscript given to lower left sides of the bank memories B[1] to B[5]. At this time, the count values UBC[1] to UBC[5] are set so as to correspond to the number of times referred to from the read cores of the bank memories B[1] to B[5].

The count value UBC[2] of the bank memory B[2] written two times before which is expressed by $W_{-2}$ is 2. At this time, the two read cores 602-1 and 602-2 are accessing the bank memory B[2]. The count value UBC[3] of the bank memory B[3] written three times before which is expressed by $W_{-3}$ is 1. At this time, one read core 602-3 is accessing the bank memory B[3].

The count value UBC[4] of the bank memory B[4] written one time before as the latest data which is expressed by $W_{-1}$ is 0, and none of the read cores 602-1 to 602-3 read bank memory B[4] yet. At this time, the bank number #4 of the bank memory B[4] is registered in the register 613.

In a time zone of interest, which is expressed by $W_{-8}$, the count value UBC[5] of the bank memory B[5] (in which the writing is not performed) is 0, and the read cores 602-1 to 602-3 are not accessed. At this time, the bank memory B[5] becomes the free bank, and the bank number #5 is registered in the register 614.

Here, when there is a write request from the write core 601, the bank memory B[1] having the bank number #1 registered so far in the register 614 is ensured as a reserved bank for writing, and is provided to the write core 601. At this time, the count value UBC[1] of the bank memory B[1] is zero. Before the bank memory B[1] is provided to the write core 601, the data of the bank memory B[4] (that is, the bank memory indicated by the register 613) in which the latest data is stored so far is copied in the bank memory B[1] (615).

When the writing in the bank memory B[1] from the write core 601 is ended and the bank memory B[1] is released to the read cores 602-1 to 602-3, the bank number #4 registered so far in the register 613 is rewritten with the bank number #1. The count value UBC[4] of the bank memory B[4] in which the latest data (one stage older) up to the previous time is stored is 0, and none of the read cores 602-1 to 602-3 are reading. Therefore, the bank memory B[4] becomes the free bank, and the bank number #4 of the bank memory B[4] is registered in the register 614. That is, the bank number registered in the register 614 is changed from {#1, #5} to {#4, #5}.

Here, the read cores 602-1 to 602-3 can read the latest data from the bank memories B[1] to B[5] without contending with the writing using the write core 601 by referring to the bank numbers #1 to #5 registered in the register 613 at the time of accessing the bank memories B[1] to B[5]. The write core 601 can write the latest data in the bank memories B[1] to B[5] without contending with the reading using the read cores 602-1 to 602-3 by referring to the bank numbers #1 to #5 registered in the register 614 at the time of accessing the bank memories B[1] to B[5].

At this time, the number of write cores 601 that can write the data in the bank memory B[1] to B[5] is limited to one, and thus, it is possible to accurately designate the bank memories B[1] to B[5] in which the latest data is written while ensuring the simultaneity of the data set written in the bank memories B[1] to B[5].

Accordingly, it is possible to guarantee the currency and simultaneity of data transmission between the write core 601 and the read cores 602-1 to 602-3 in a lockless manner. That is, it is possible to transmit the latest data set of which the simultaneity is ensured between the cores while improving the real-time properties of the processing using the multi-core system. Even though the number of read cores increases, it is possible to cope with such an increase of the number of read cores by increasing the number of memory banks in the scratchpad memory 611. Therefore, it is possible to realize a 1-to-n broadcast data transmission device that does not require the waiting time due to the spinlock.

Operation timings of the write core 601 and the read cores 602-1 to 602-3 are asynchronous. When a write cycle is faster than a read cycle, data can be appropriately skipped on a read side, and when the read cycle is faster than the write cycle, the same data can be appropriately read in a repetitive manner. Thus, it is not necessary to match the write cycle and the read cycle of the multi-core system, and thus, it is possible to improve flexibility of data input and output period for each core.

Figure 7:
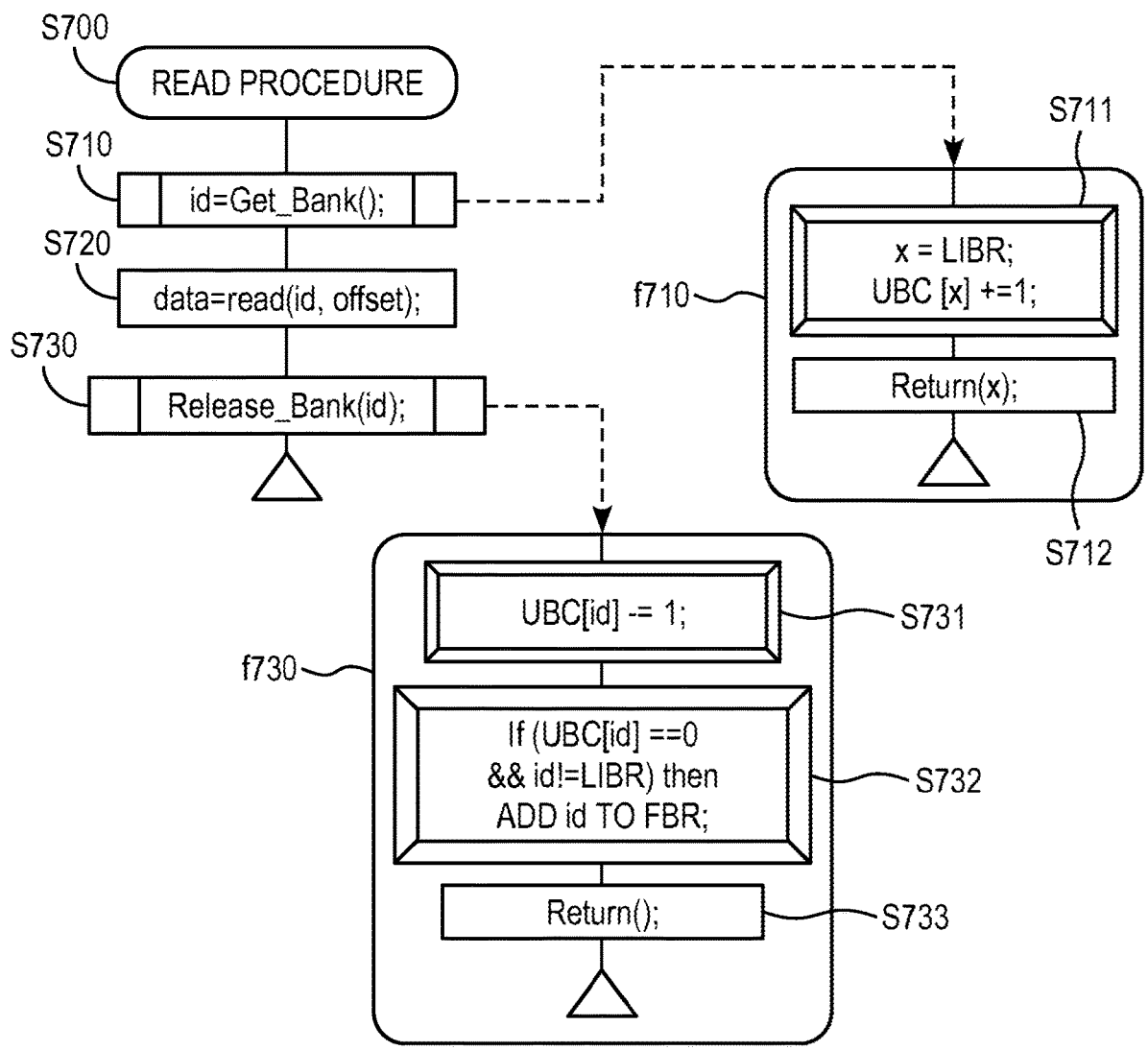
FIG. 7 is a flowchart illustrating a read procedure of the data transmission device according to the embodiment.

FIG. 7 is a flowchart illustrating a read procedure of the data transmission device according to the embodiment.

In FIG. 7, when read procedure S700 is started, the read cores 602-1 to 602-3 call Get_Bank function f710, and acquires an accessible bank number id from a return value (step S710). In the example of FIG. 6, the bank number id is set as any value from #1 to #5.

Subsequently, the read cores 602-1 to 602-3 execute read (id, offset). At this time, desired variable value data items are read by using an offset address offset from a head of the bank memory B[id] designated by the bank number id (step S720). Step S720 can be repeatedly performed until all the desired variable value data items are read.

Subsequently, the read cores 602-1 to 602-3 call Release_Bank function f730, and return the bank ensured by the Get_Bank function f710 (step S730). The data of the bank memory B[id] ensured by the Get_Bank function f710 is captured and is not changed by other factors between the call of the Get_Bank function f710 and the call of the Release_Bank function f730. Thus, it is possible to ensure the simultaneity of the data set used for calculation processing.

Although the series of read procedures S700 have been described in the aforementioned embodiment on the assumption that one core is used in one place, one core may be used in a plurality of places of different tasks that can be preempted in the same core. In such a case, the number of read cores corresponding to the plurality of places in which the reading is performed is regarded as being increased, and it is possible to cope with the increase of the number of read cores by increasing the number of bank memories. However, from the viewpoint of saving the memory resources, the task of one main place of the same core is accessed, and the value is copied to the local variable. Thus, the local variable may be used in the plurality of tasks. It is possible to achieve reduction in management complexity, debugging, and the easiness of the change by this [1 external input interface/1 core] technique.

In Get_Bank function f710, the bank numbers #1 to #5 of the bank memories B[1] to B[5] in which the latest data is present are acquired from the register 613. At this time, when the bank numbers #1 to #5 of the bank memories B[1] to B[5] in which the latest data is present are latest information bank registers (LIBRs), the LIBR is set to a variable x.

The count values UBC[x] of the bank memories B[1] to B[5] are incremented by 1 (step S711). Since the register 613 and the count values UBC[1] to UBC[5] are present on the shared memory 610, the operations thereof are executed according to the atomic instruction.

Subsequently, the process returns to a main routine by using the variable x for specifying the bank numbers #1 to #5 of the bank memories B[1] to B[5] in which the latest data is present (step S712).

In Release_Bank function f730, the count value UBC[id] of the bank memory B[id] is decremented by 1 before the bank memory B[id] designated by the bank number id is returned (step S731). Since the count value UBC[id] is present on the shared memory 610, this operation is executed according to the atomic instruction.

Subsequently, when the count value UBC[id] is 0 and the bank number id does not match the bank numbers #1 to #5 registered in the register 613 (that is, there is no latest data), the bank memory B[id] designated by the bank number id is regarded as the free bank, and the bank number id is registered in the register 614 (step S732). Since the registers 613 and 614 and the count values UBC[1] to UBC[5] are present on the shared memory 610, the operations thereof are executed according to the atomic instruction.

Subsequently, the process returns to the main routine, and the series of reading procedures S700 are ended (step S733).

Figure 8:
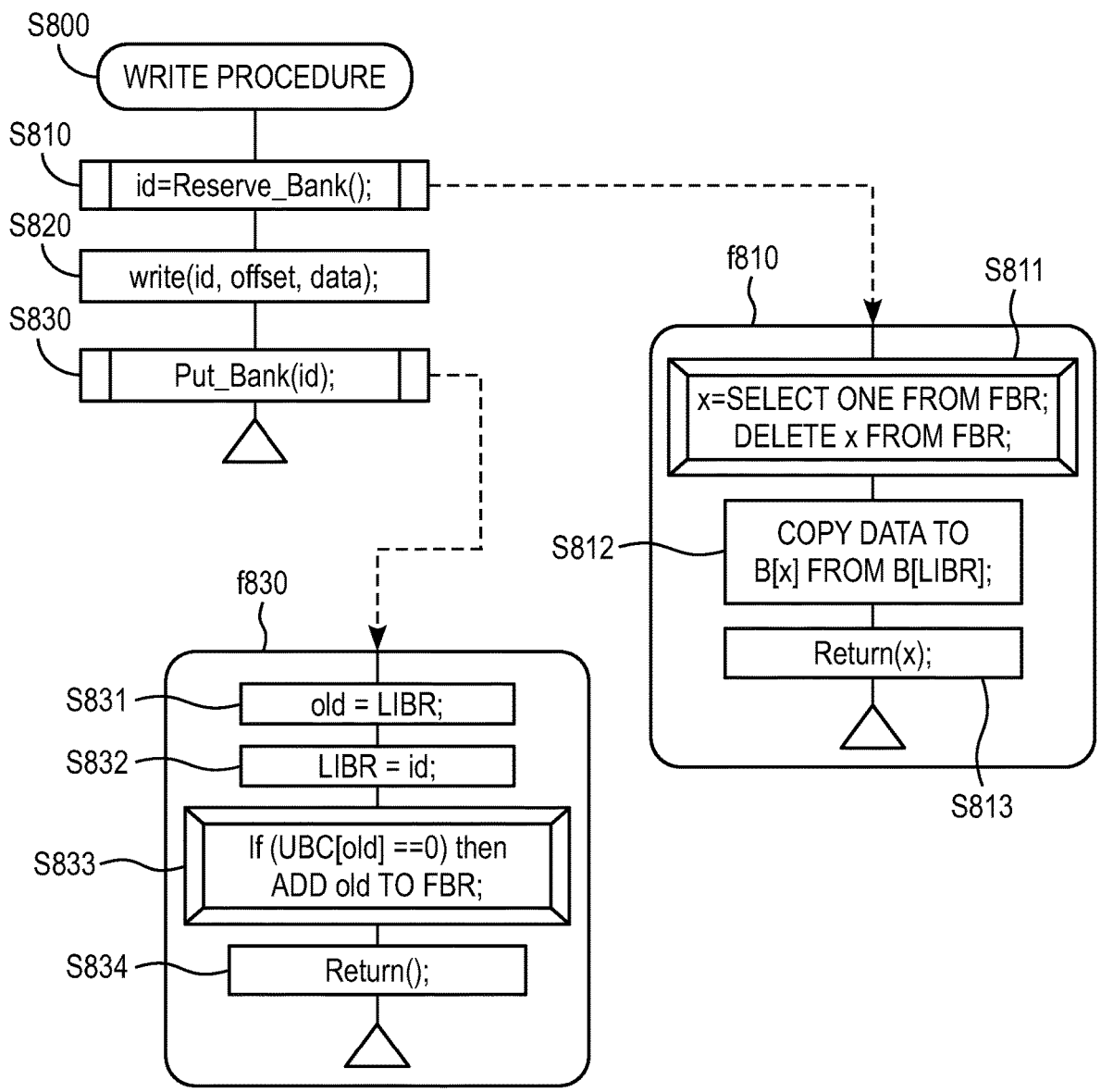
FIG. 8 is a flowchart illustrating a write procedure of the data transmission device according to the embodiment.

FIG. 8 is a flowchart illustrating a write procedure of the data transmission device according to the embodiment.

In FIG. 8, when a write procedure S800 is started, the write core 601 calls Reserve_Bank function f810, and acquires an accessible bank number id from the return value (step S810). In the example of FIG. 6, the bank number id is set as any value from #1 to #5.

Subsequently, the write core 601 executes write (id, offset, data). At this time, desired variable value data items are rewritten by using the offset address offset from the head of the bank memory B[id] designated by the bank number id (step S820). Step S820 can be repeatedly performed until all the requested variable value data items are rewritten.

The latest data at the previous time is copied to the variable of which the value is not changed in advance in Reserve_Bank function f810, and it is not necessary to perform any operation.

Subsequently, Put_Bank function f830 is called, and the bank memory B[id] ensured by Reserve_Bank function f810 is opened (step S830). The data of the bank memory B[id] ensured by Reserve_Bank function f810 is protected from accessing from the read cores 602-1 to 602-3 and other factors are not referred to between the call of Reserve_Bank function f810 and the call of Put_Bank function f830. Thus, the simultaneity of the data set used for the calculation processing can be ensured from the viewpoint of the reading cores 602-1 to 602-3.

In Reserve_Bank function f810, the bank numbers #1 to #5 of the free banks are acquired from the register 614, and the bank numbers #1 to #5 are deleted from the register 614 (step S811). In FIG. 8, the register 614 is represented as a free bank register (FBR), one bank number is selected from the FBR, and the selected bank number is set to the variable x. The bank number selected and extracted from the FBR is deleted from the FBR itself. Since the register 614 is present on the shared memory 610, the operations thereof are performed according to the atomic instruction.

Subsequently, data is copied from a bank memory B[LIBR] in which the latest data is ensured to a bank memory B[x] ensured by Reserve_Bank function f810 (step S812).

Subsequently, the process returns to the main routine by using the variable x for specifying the bank numbers #1 to #5 of the free banks as the return value (step S813).

In Put_Bank function f830, before the bank memory B[id] designated by the bank number is released, the value of the LIBR so far is called and is temporarily stored in a variable old (step S831). Since the variable old is stored in the local RAMS (102, 112) of the write core 601, it is not necessary to use the atomic instruction.

Subsequently, the value of the LIBR registered in the register 613 is rewritten with the bank number id of the bank memory B[id] released at the current time (step S832).

Although the register 613 is located on the shared memory 610, since only Put_Bank function f830 is present as a function that rewrites a value, it is not necessary to use the atomic instruction. At this point of time, since the preparation of the latest data is completed, the value can be referred to from any of the read cores 602-1 to 602-3.

Subsequently, a count value UBC[old] of a bank memory B[old] in which the previous latest data is ensured is checked (step S833). When the count value UBC[old] is 0, the bank memory B[old] is not referred to by any of the read cores 602-1 to 602-3, and the data is out of date. Therefore, this bank memory B[old] is regarded as the free bank, and this variable old is registered in the register 614 (denoted as FBR in FIG. 8). Since the register 614 and the count values UBC[1] to UBC[5] are present on the shared memory 610, the operations thereof are performed according to the atomic instruction.

Subsequently, the process returns to the main routine, and a series of write procedures S800 are ended (step S834).

Figure 12:
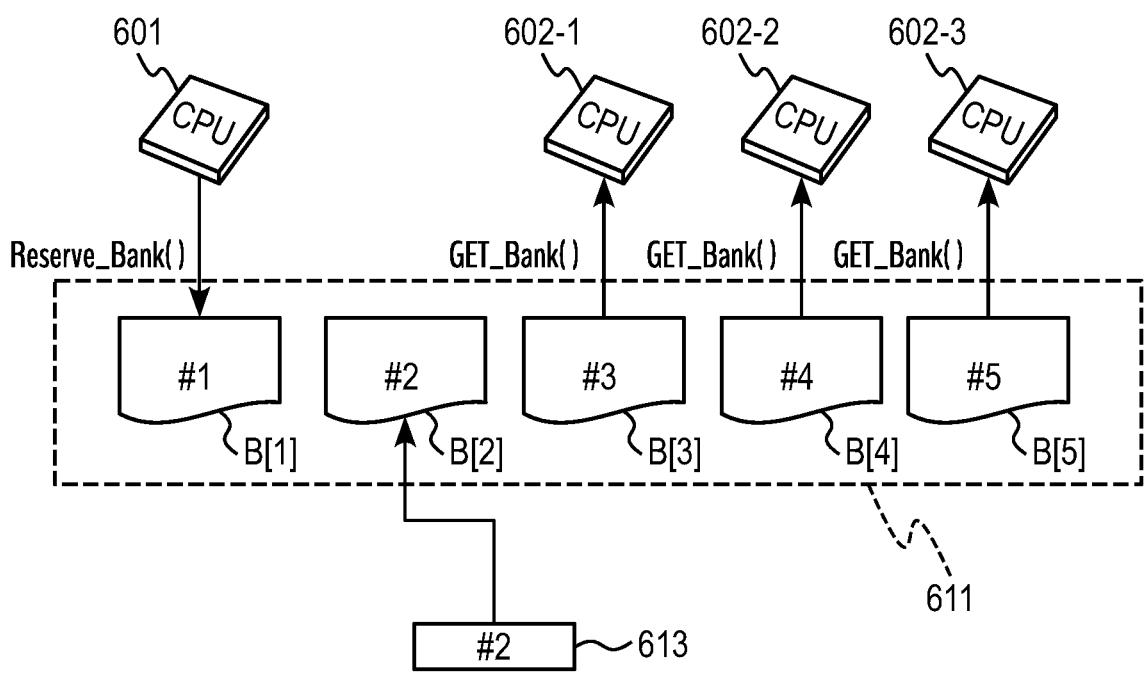
FIG. 12 is a diagram illustrating a relationship between the number of banks and the number of cores of the scratchpad memory of the data transmission device according to the embodiment.

Hereinafter, an example in which the embodiment described with reference to FIGS. 6 to 8 is applied to multi-core embedded control software will be described. As an application example, the fuel injection system of the engine of FIG. 1 is used as an example. At this time, the write core 601 of FIG. 6 can be provided in the CPU 100 of FIG. 1. The read core 602-1 of FIG. 6 can be provided in the CPU 110 of FIG. 1. The bank memories B[1] to B[3] of FIG. 6 (why three bank memories are necessary is illustrated in FIG. 12) and the registers 613 and 614 can be provided and the count values UBC[1] to UBC[3] can be stored in the shared RAM 120 of FIG. 1. The scratchpad memory 611 can be constituted by bundling the bank memories B[1] to B[3].

Reserve_Bank function f810 and Put_Bank function f830 can be implemented in an execution code storage region in which the execution code 101 is stored. Get_Bank function f710 and Release_Bank function f730 can be implemented in an execution code storage region in which the execution code 111 is stored.

Figure 9:
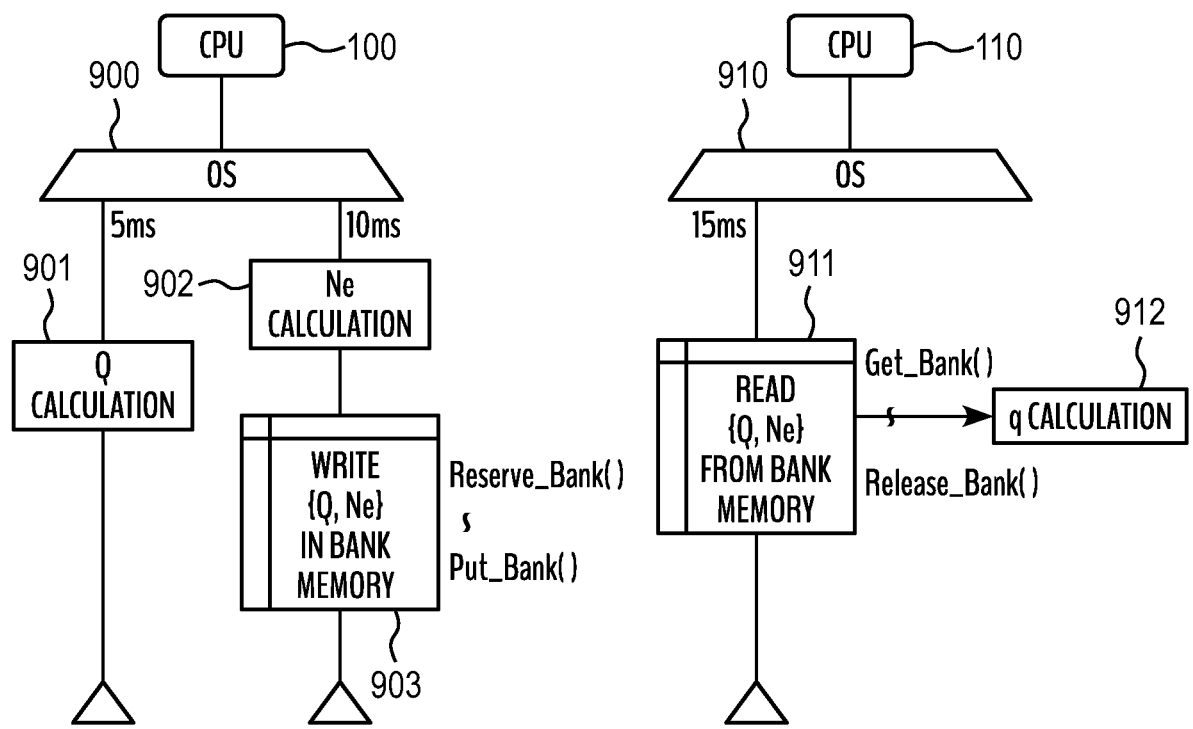
FIG. 9 is a flowchart illustrating a data transmission procedure when the data transmission device according to the embodiment is applied to the fuel injection system of the engine.

FIG. 9 is a flowchart illustrating a data transmission procedure when the data transmission device according to the embodiment is applied to the fuel injection system of the engine. FIG. 9 illustrates a case where the mass flow method of FIG. 2(a) is applied to the fuel injection system of the engine of FIG. 1.

In FIG. 9, a real-time operating system (OS) 900 is implemented on the CPU 100. The CPU 100 can periodically execute 5 ms and 10 ms tasks under the command of the OS 900. The OS 900 can be implemented in the execution code 101 of FIG. 1.

A task execution time of 5 ms can be set based on a sampling cycle of a digital filter used in calculation 901 of the intake air amount Q. A task execution time of 10 ms can be set based on a sampling period of a digital filter used in calculation 902 of the engine rotational speed Ne.

The CPU 100 is mainly in charge of input processing from the sensor. In the 5 ms task, the calculation 901 of the intake air amount Q is performed. In the 10 ms task, the calculation 902 of the engine rotational speed Ne is performed. As results of the calculations 901 and 902, instantaneous values of the data set {Q, Ne} are confirmed. The calculation 901 of the intake air amount Q and the calculation 902 of the engine rotational speed Ne are performed while using the memory resource of the local RAM 102 by using the execution code 101.

Subsequently, the CPU 100 can write the latest data set {Q, Ne} in the bank memories B[1] to B[3] provided in the shared RAM 120 by performing the write procedure 800 of FIG. 8 (903).

At this time, the CPU 100 can ensure the bank memories B[1] to B[3] or release the bank memories B[1] to B[3] to be written while referring to and updating the count values UBC[1] to UBC[3] and the values of the registers 613 and 614 by calling Reserve_Bank function f810 and Put_Bank function f830 in the write procedure S800. The processing of Reserve_Bank function f810 and Put_Bank function f830 are performed for the scratchpad memory 611 on the shared RAM 120 while referring to and updating the count values UBC[1] to UBC[3] and the values of the registers 613 and 614 by using the execution code 101. Even though a preparation time and a transmission time (a time necessary for the write procedure S800) of the latest data set {Q, Ne} are extended, an operation delay of another read core is not caused.

A real-time OS 910 is implemented on the CPU 110. The CPU 110 can periodically execute a 15 ms task under the command of the OS 910. The OS 910 can be implemented in the execution code 111 in FIG. 1. A task execution time of 15 ms can be set based on an operation time (necessary time resolution) of an output actuator.

The CPU 110 is mainly in charge of calculation and instruction value calculation of the output actuator. In the 15 ms task, when the scratchpad memory 611 is read out, the calculation 912 of the fuel injection amount q is performed. The calculation 912 of the fuel injection amount q is performed while using the memory resource of the local RAM 112 by using the execution code 111.

In order to perform the calculation 912 of the fuel injection amount q, the CPU 110 can read out the latest data set {Q, Ne} from the bank memories B[1] to B[3] provided on the shared RAM 120 by performing the read procedure S700 of FIG. 7 (911).

At this time, the CPU 110 can ensure the bank memories B[1] to B[3] or return the bank memories B[1] to B[3] while referring to and updating the count values UBC[1] to UBC[3] and the values of the registers 613 and 614 by calling Get_Bank function f710 and Release_Bank function f730 in the read procedure S700. The processing of Get_Bank function f710 and Release_Bank function f730 is performed for the scratchpad memory 611 on the shared RAM 120 while referring to and updating the count values UBC[1] to UBC[3] and the values of the registers 613 and 614 by using the execution code 111.

Since the contents of the bank memories B[1] to B[3] are retained with no change between the processing of Get_Bank function f710 and the processing of Release_Bank function f730, any variable on the bank memory B[1] to B[3] can be read by any number of times.

Even though a retaining time (time necessary for the read procedure S700) is extended, operation delays of other write core and read cores are not caused.

Figure 10:
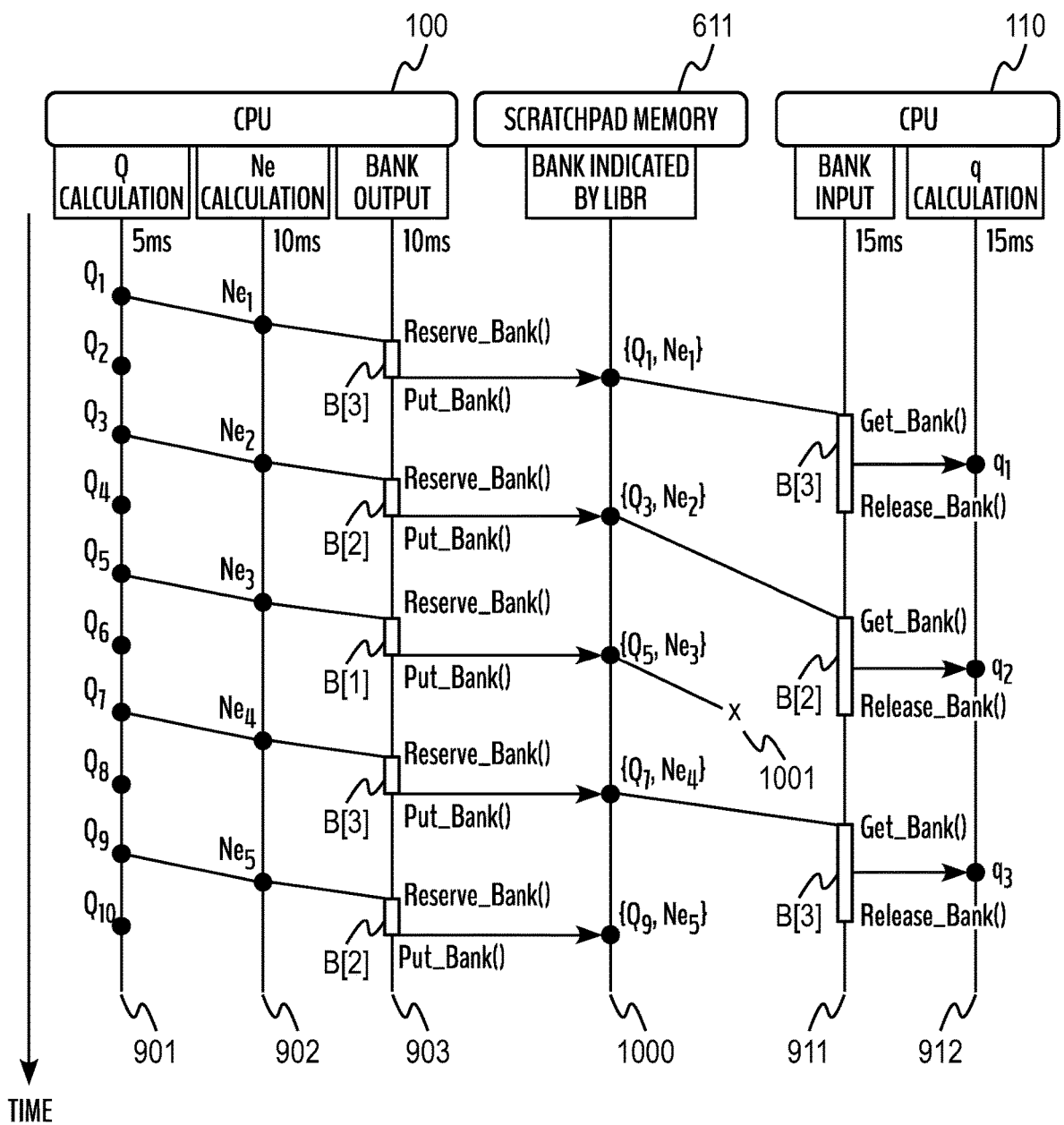
FIG. 10 is a sequence diagram illustrating a data transmission method in a sequence of time when the data transmission device according to the embodiment is applied to the fuel injection system of the engine.

FIG. 10 is a sequence diagram illustrating a data transmission method in a sequence of time when the data transmission device according to the embodiment is applied to the fuel injection system of the engine.

In FIG. 10, in Q calculation 901 of the CPU 100, intake air amounts $Q_1$ to $Q_{10}$ are calculated every 5 ms. In Ne calculation 902 of the CPU 100, engine rotational speeds Ne1 to Ne5 are calculated every 10 ms. In bank output 903, Reserve_Bank function f810 and Put_Bank function f830 are called every 10 ms, and the data set {Q, Ne} is written in the bank memories B[1] to B[3].

When the latest data set {Q, Ne} is written in the bank memories B[1] to B[3] of the scratchpad memory 611, the bank numbers #1 to #3 of B[1] to B[3] of the bank memories B[1] to B[3] in which the latest data set {Q, Ne} is written are registered in the register 613. In FIG. 10, the register 613 is expressed as LIBR. A data change in bank contents due to the latest data is indicated by 1000.

The Q calculation 901 is performed every 5 ms, and the Ne calculation 902 is performed every 10 ms. Thus, from the bank output 903, it seems that the intake air amounts $Q_1$ to $Q_{10}$ through the Q calculation 901 are skipped once every two times.

However, the output of the Q calculation 901 is actually an output value of the digital filter. Thus, even though a calculation cycle of the Q calculation 901 is decided by the sampling time of the digital filter and the intake air amounts $Q_2$, $Q_4$, $Q_6$, $Q_8$, and $Q_{10}$ through the Q calculation 901 are not used as the bank output 903, the bank output is a sample value influencing the intake air amounts $Q_1$, $Q_3$, $Q_5$, $Q_7$, and $Q_9$ used as the bank output 903. Thus, the Q calculation 901 of the intake air amounts $Q_2$, $Q_4$, $Q_6$, $Q_8$, and $Q_{10}$ is not useless.

In the bank input 911, Get_Bank function f710 and Release_Bank function f730 are called every 15 ms, and the latest data set {Q, Ne} is read from the bank memories B[1] to B[3].

In the q calculation 912 of the CPU 110, fuel injection amounts $q_1$ to $q_3$ are calculated every 15 ms based on the latest data set {Q, Ne}.

For example, when the CPU 100 assumes that the bank memory B[3] is the free bank at the time of calculating the intake air amount $Q_1$ and the engine rotational speed $Ne_1$, the CPU 100 ensures the bank memory B[3] by using Reserve_Bank function f810, and writes the data set {$Q_1$, $Ne_1$} in the bank memory B[3]. The bank memory B[3] is released by Put_Bank function f830. At this time, the bank number #3 of the bank memory B[3] in which the latest data is registered is indicated by LIBR (register 613).

Subsequently, the CPU 110 ensures the bank memory B[3] by using Get_Bank function f710, and reads out the data set {$Q_1$, $Ne_1$} from the bank memory B[3]. The CPU 110 calculates the fuel injection amount $q_1$ based on the data set {$Q_1$, $Ne_1$}, and returns the bank memory B[3] by using Release_Bank function f730.

Before the CPU 110 returns the bank memory B[3], the CPU 100 calculates the intake air amount $Q_3$ and the engine rotational speed $Ne_2$. At this time, when it is assumed that the bank memory B[2] is the free bank, the CPU 100 ensures the bank memory B[2] by using Reserve_Bank function f810 without waiting for the return of the bank memory B[3], and writes the data set {$Q_3$, $Ne_2$} in the bank memory B[2]. The bank memory B[2] is released by using Put_Bank function f830. At this time, the bank number #2 of the bank memory B[2] in which the latest data is registered is indicated by LIBR (register 613).

Subsequently, the CPU 110 ensures the bank memory B[2] by using Get_Bank function f710, and reads out the data set {$Q_3$, $Ne_2$} from the bank memory B[2]. The CPU 110 calculates the fuel injection amount $q_2$ based on the data set {$Q_3$, $Ne_2$}, and returns the bank memory B[2] by using Release_Bank function f730.

Before the CPU 110 returns the bank memory B[2], the CPU 100 calculates the intake air amount $Q_5$ and the engine rotational speed $Ne_3$. At this time, when it is assumed that the bank memory B[1] is the free bank, the CPU 100 ensures the bank memory B[1] by using Reserve_Bank function f810 without waiting for the return of the bank memory B[2], and writes the data set {$Q_5$, $Ne_3$} in the bank memory B[1]. The bank memory B[1] is released by Put_Bank function f830. At this time, the bank number #1 of the bank memory B[1] in which the latest data is registered is indicated by LIBR (register 613).

At this time, even though the bank memory B[1] in which the latest data is registered is indicated by LIBR, the CPU 110 can continue the calculation of the fuel injection amount $q_2$ based on the older data set {$Q_3$, $Ne_2$} before the CPU 110 returns the bank memory B[2].

Subsequently, when the CPU 100 assumes that the bank memory B[3] is the free bank at the time of calculating the intake air amount $Q_7$ and the engine rotational speed $Ne_4$, the CPU 100 ensures the bank memory B[3] by using Reserve_Bank function f810, and writes the data set {$Q_7$, $Ne_4$} in the bank memory B[3]. The bank memory B[3] is released by Put_Bank function f830. At this time, the bank number #3 of the bank memory B[3] in which the latest data is registered is indicated by LIBR (register 613).

Subsequently, the CPU 110 ensures the bank memory B[3] by using Get_Bank function f710, and reads out the data set {$Q_7$, $Ne_4$} from the bank memory B[3]. The CPU 110 calculates the fuel injection amount $q_3$ based on the data set {$Q_7$, $Ne_4$}, and returns the bank memory B[3] by using Release_Bank function f730.

At this time, the data set {$Q_5$, $Ne_3$} written in the bank memory B[1] is older than the data set {$Q_7$, $Ne_4$} written in the bank memory B[3]. Thus, the CPU 110 can read out the data set {$Q_7$, $Ne_4$} from the bank memory B[3] without reading out the data set {$Q_5$, $Ne_3$} written in the bank memory B[1].

At this time, it is possible to perform data set skipping 1001 {$Q_5$, $Ne_3$}.

That is, the bank output 903 performed by the CPU 100 for the scratchpad memory 611 is performed at a cycle of 10 ms. The bank input 911 from the scratchpad memory 611 to the CPU 110 is performed at a cycle of 15 ms. At this time, when it is focused on the data change 1000 of the scratchpad memory 611, whenever the bank output 903 is performed three times, the data set skipping 1001 for the bank input 911 can be performed only once.

In this manner, the data can be asynchronously transmitted and received between a transmitter and a receiver, and the receiver can constantly acquire at least the latest data set if requested. The transmitter can concentrate on updating the latest value without considering the convenience of the receiver. Therefore, since the transmitter and the receiver of data are loosely coupled and the operation of the other one is not dragged at the timing of the operation of one, robustness can be ensured.

Figure 11A:
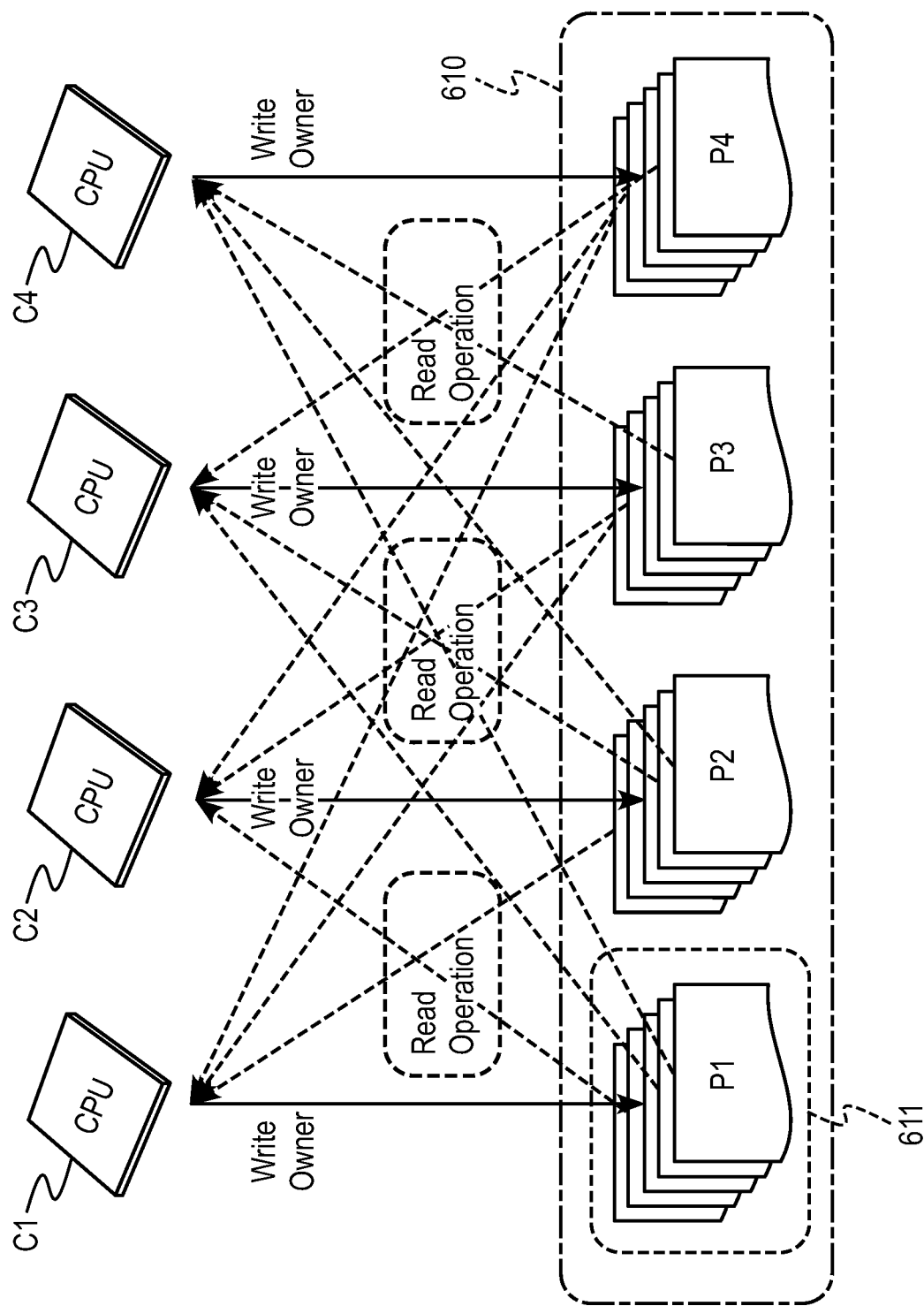
FIG. 11A is a diagram illustrating an occupation relationship between a write core and a scratchpad memory of the data transmission device according to the embodiment.

FIG. 11(a) is a diagram illustrating an occupation relationship between the write core and the scratchpad memory of the data transmission device according to the embodiment.

In FIG. 11(a), four scratchpad memories P1 to P4 and four cores C1 to C4 accessible to these scratchpad memories P1 to P4 are provided. At this time, the number of scratchpad memories P1 to P4 and the number of cores C1 to C4 can be equal. Five bank memories can be provided in each of the scratchpad memories P1 to P4. For example, the scratchpad memory P1 can have the same configuration of that of the scratchpad memory 611 of FIG. 6. The number of banks of each of the scratchpad memories P1 to P4 can be set to the total number of cores +1. The scratchpad memories P1 to P4 can be arranged on the shared memory 610.

The cores C1 to C4 can be provided in a CPU used for writing and reading. At this time, each of the cores C1 to C4 can be operated as the write core or can be operated as the read core so as to correspond to the scratchpad memories P1 to P4 to be accessed.

Here, the core C1 can be operated as the write core for the scratchpad memory P1, and can be operated as the read core for the scratchpad memories P2 to P4. The core C2 can be operated as the write core for the scratchpad memory P2, and can be operated as the read core for the scratchpad memories P1, P3, and P4. The core C3 can be operated as the write core for the scratchpad memory P3, and can be operated as the read core for the scratchpad memories P1, P2, and P4. The core C4 can be operated as the write core for the scratchpad memory P4, and can be operated as the read core for the scratchpad memories P1 to P3.

That is, a relationship in which each of the cores C1 to C4 is operated as the write core 601 for the scratchpad memories P1 to P4 which are write owners, and the other cores C1 to C4 are operated as one of the read cores 602-1 to 602-3 for the scratchpad memories P1 to P4 which are the write owners is established.

FIG. 11(b) is a diagram illustrating a method of assigning an operation function to the scratchpad memory for each core of the data transmission device according to the embodiment. These operation functions can be stored in a local execution code storage region of each core.

Reserve_Bank P( ) and Put_Bank P( ) which are write-related functions are implemented for the scratchpad memory which is the write owner, and Get_Bank P( ) and Release_Bank P( ) which are read-related functions are implemented for the other scratchpad memories. Here, P is a memory number for the scratchpad memories P1 to P4.

Here, the plurality of scratchpad memories P1 to P4 is provided, and the number of scratchpad memories P1 to P4 and the number of cores C1 to C4 are equal. Thus, when a system in which only one write core is assigned to one scratchpad memory is constructed, the plurality of cores C1 to C4 can simultaneously execute the write operations.

Reserve_Bank P( ) and Put_Bank P( ) which are the write-related functions for the scratchpad memories other than the scratchpad memories P1 to P4 which are the write owners are not retained, and thus, it is possible to prevent incorrect writing in the scratchpad memory.

Get_Bank P( ) and Release_Bank P( ) which are the read-related functions for the scratchpad memories P1 to P4 which are the write owners are not retained, and thus, it is possible to prevent incorrect reading (prevent misunderstanding of the read banks).

As described above, according to the above-described embodiment, the data can be transmitted between the cores C1 to C4 by using the scratchpad memories P1 to P4, and thus, the data can be asynchronously transmitted and received between the cores even in the multi-core. In the operations of the scratchpad memories P1 to P4, it is not necessary to use the spinlock method, and it is possible to increase the speed of the data transmission without the lock waiting time.

It is possible to cope with the increase of the number of cores by simply increasing the number of scratch memories for a multi-core in which the number of cores is increased more than the number of cores illustrated, and it is possible to prevent the occurrence of the execution delay.

As a guideline for designing the number of banks in the scratchpad memory, when the number of cores accessible to the scratchpad memory is N (one of which is the write owner), a total of N+1 bank memories can be provided.

FIG. 12 is a diagram illustrating a relationship between the number of banks and the number of cores of the scratchpad memory of the data transmission device according to the embodiment. FIG. 12 illustrates a state in which the bank memories B[1] to B[5] are maximally used in the write core 601 and the read cores 602-1, 602-2, and 602-3 in FIG. 6.

In FIG. 12, Get_Bank( ) function is called from the read cores 602-1, 602-2, and 602-3 to the bank memories B[3] to B[5], and the read cores 602-1, 602-2, and 602-3 are using separate bank memories B[3] to B[5]. At this time, (N−1) number of bank memories B[3] to B[5] are maximally occupied only by reading out.

In this state, it is assumed that the write core 601 continuously writes twice. That is, it is assumed that the writing in the bank memory B[2] using the write core 601 is ended while the read cores 602-1, 602-2, and 602-3 are using separate bank memories B[3] to B[5]. At this time, the bank number #2 of the bank memory B[2] in which the latest data is written is registered in the register 613.

Here, the number of bank memories is increased more than the number of cores by one, and thus, it is possible to register the bank memory B[1] as the free bank even though the latest data is written in the bank memory B[2], and the read cores 602-1, 602-2, and 602-3 are using the bank memories B[3] to B[5].

Therefore, after the writing in the bank memory B[2] is ended, the write core 601 can call Reserve_Bank( ) function for the bank memory B[1] without waiting for the return of the bank memories B[3] to B[5] from the read cores 602-1, 602-2, and 602-3, and can write in the bank memory B[1]. When the read cores 602-1, 602-2, and 602-3 return any of the bank memories B[3] to B[5] and requests a new read request while writing in the bank memory B[1], it is possible to provide the latest data bank B[2].

At this time, since one bank is necessary for the previous and current writing, two banks are necessary for writing. That is, since it is understood that a maximum of (N−1) number of banks are necessary only for reading, a total of (N−1)+2=(N+1) banks are necessary.

While the write core 601 is writing in the bank memory B[1], writing in the bank memory B[1] is ended in preparation for a new read request, and the state of the bank memory B[2] is retained until the bank memory B[1] is released (Put_Bank( ) function is called). Thereafter, when there is no change in the occupation state of the bank memories B[3] to B[5] of the read cores 602-1, 602-2, and 602-3 and a new write request is generated, it is possible to achieve both the retention of the latest data for reading and the execution of the write request by alternately switching between the bank memory indicated by the register 613 and the bank memory occupied by the write core 601 by using Reserve_Bank( ) function.

As described above, according to the above-described embodiment, it is possible to perform the data transmission between the cores without the lock waiting time and without failing the simultaneity of the data set. It is possible to perform the data transmission between the cores while maintaining almost the same transmission time as that of the case in which two cores are used by increasing the number of banks even in the multi-core in which the number of cores is increased, and it is possible to prevent the failure of the multi-core system due to the increase of the delay time.

Although the embodiment according to the present invention has been specifically described, the present invention is not limited to the above-described embodiment, and various modifications can be made without departing from the scope of the present invention. In particular, the number of cores of the CPU is not limited to two and four as described in the embodiment, and may be N (N is an integer of 2 or more) number of multi-cores.

In addition, the above-described configurations, functions, and processing units can be realized as hardware by designing all or part thereof as an integrated circuit. The processor executes programs that realize the functions, and thus, the above-described configurations, functions, and processing units can be realized as software. The above-described configurations, functions, and processing units can be realized as firmware or a device control language closely related to the integrated circuit.

REFERENCE SIGNS LIST

100, 110 CPU
101, 111 execution code
102, 112 local RAM
120 shared RAM
601 write core
602-1, 602-2, 602-3 read core
610 shared memory
611 scratchpad memory
612 counter array region
UBC[1] to UBC[5] count value
613, 614 register
B[1] to B[5] bank memory

The invention claimed is:

1. A data transmission device for in-vehicle multi-core control that includes M (M is an integer of 2 or more) bank memories and N (N is an integer of 2 or more) processors configured to access the M bank memories, the device comprising:
    a shared memory on which the M bank memories are arranged and which is accessible by the N processors; and
    an access control circuit that controls access to the M bank memories by the N processors based on identification information for specifying the M bank memories, wherein:
        the access control circuit:
            assigns only one processor used for writing to a bank memory, of the M bank memories, in which writing is performed,
            assigns K (K is an integer of 1 or more and N−1 or less) processors used for reading from a bank memory, of the M bank memories, in which reading is performed, and
            exclusively controls bank memory access such that the bank memory in which the writing is performed and the bank memory in which the reading is performed are not the same, and
        contents of a bank memory in which writing was last performed are copied to the bank memory in which the writing is performed by the only one processor before the access control circuit assigns the only one processor.

2. The data transmission device for in-vehicle multi-core control according to claim 1, wherein the access control circuit returns the identification information of the bank memory in which writing was last performed when the reading is performed, and returns the identification information of a given bank memory, other than the bank memory in which writing was last performed.

3. The data transmission device for in-vehicle multi-core control according to claim 1, wherein a number of processors used for writing is set as 1, K is set as N−1, and M is set as N+1.

4. The data transmission device for in-vehicle multi-core control according to claim 1, further comprising:
    N scratchpad memories each obtained by grouping the M bank memories,
    wherein N processors are used for writing and are in one-to-one correspondence with the N scratchpad memories.

5. The data transmission device for in-vehicle multi-core control according to claim 4, wherein execution codes for realizing a write operation and a read operation performed for the N scratchpad memories and functions including the execution codes are retained in an execution code storage region locally provided for each processor.

6. The data transmission device for in-vehicle multi-core control according to claim 5, wherein only a write code and a write function are implemented for the only one processor used for writing which corresponds to a first of the N scratchpad memories, and only a read code and a read function are implemented for the K processors used for reading which correspond to a second of the N scratchpad memories.

7. The data transmission device for in-vehicle multi-core control according to claim 1, further comprising:
a counter array region, a first register, and a second register arranged in the shared memory,
wherein the counter array region stores a number of times of accessing the M bank memories by the K processors,
the first register stores identification information for specifying the bank memory in which writing was last performed,
the second register stores identification information for specifying a different bank memory than the bank memory in which writing was last performed, and
the access control circuit controls access to the M bank memories based on the number of times of accessing stored in the counter array region, the identification information stored in the first register, and the identification information stored in the second register.

8. A data transmission method comprising:
providing a device for in-vehicle multi-core control that includes M (M is an integer of 2 or more) bank memories and N (N is an integer of 2 or more) processors accessible to the M bank memories;
arranging the M bank memories on a shared memory which is accessible by the N processors;
controlling, using an access control circuit, access to the M bank memories by the N processors based on identification information for specifying the M bank memories;
assigning only one processor used for writing to a bank memory, of the M bank memories, in which writing is performed;
assigning K (K is an integer of 1 or more and N−1 or less) processors used for reading from a bank memory, of the M bank memories, in which reading is performed,
exclusively controlling bank memory access such that the bank memory in which the writing is performed and the bank memory in which the reading is performed are not the same, and
copying contents of a bank memory in which writing was last performed to the bank memory in which the writing is performed by the only one processor before the access control circuit assigns the only one processor.

* * * * *